United States Patent [19]

Pieper

[11] 4,383,568
[45] May 17, 1983

[54] TREAD CONFIGURATION FOR MOTOR VEHICLE TIRES

[75] Inventor: Henner Pieper, Langenhagen, Fed. Rep. of Germany

[73] Assignee: Continental Gummi-Werke Aktiengesellschaft, Hanover, Fed. Rep. of Germany

[21] Appl. No.: 365,030

[22] Filed: Apr. 2, 1982

Related U.S. Application Data

[63] Continuation-in-part of Ser. No. 177,858, Aug. 14, 1980, abandoned.

[30] Foreign Application Priority Data

Aug. 18, 1979 [DE] Fed. Rep. of Germany ... 7923582[U]

[51] Int. Cl.$^3$ .............................................. B60C 11/00
[52] U.S. Cl. ................................ 152/209 R; D12/138
[58] Field of Search ...................... 152/209 R, 209 D; D12/136, 138, 142, 145

[56] References Cited

U.S. PATENT DOCUMENTS

| | | | |
|---|---|---|---|
| 3,998,256 | 12/1976 | Vedier | 152/209 R |
| 4,055,209 | 10/1977 | Senger | 152/209 R |
| 4,221,254 | 9/1980 | Roberts | 152/209 D |

Primary Examiner—Michael W. Ball
Attorney, Agent, or Firm—Becker & Becker, Inc.

[57] ABSTRACT

A tread configuration for motor vehicle tires, particularly spare tires, with several peripheral rows of essentially V-shaped blocks. The points of the blocks which sequentially follow each other in the peripheral direction of the tire alternately point in opposite directions transverse to the peripheral direction of the tire. Three rows of blocks are provided, and are separated from each other by linearly extending peripheral grooves. The width of the two outer rows corresponds essentially to the axial dimension of a block; in the middle row, the successive blocks are laterally displaced or offset with respect to each other in such a way that the width of this middle row is approximately 1.3 to 1.8 times the axial dimension of a block.

4 Claims, 1 Drawing Figure

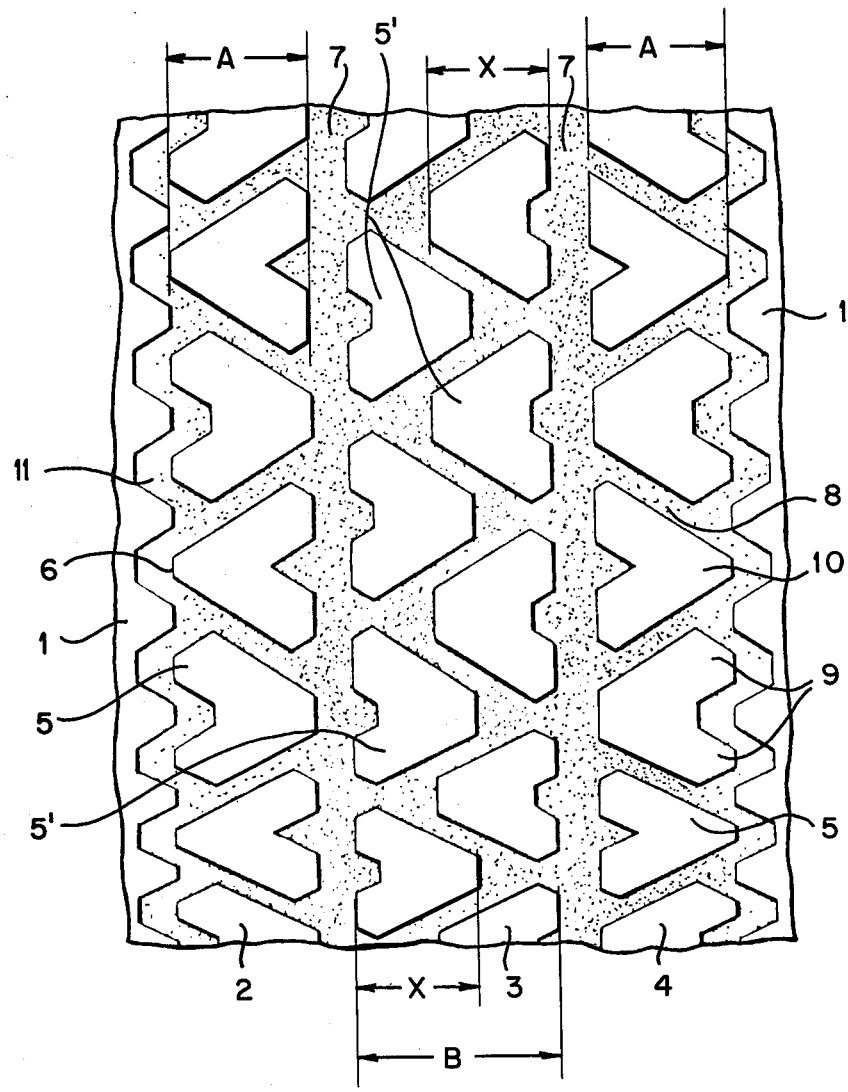

TREAD CONFIGURATION FOR MOTOR VEHICLE TIRES

This is a Continuation-In-Part of co-pending application Ser. No. 177,858—Pieper filed Aug. 14, 1980, now abandoned.

The present invention relates to a tread configuration for motor vehicle tires, especially spare tires, with several peripheral rows of essentially V-shaped blocks, with the points of successive blocks, as seen in the peripheral direction of the tire, alternately pointing in opposite directions transverse to the circumferential or peripheral direction of the tire.

With known tread configurations of this type, the tread is provided with four or five peripheral rows, so that utilization as a normal street profile is possible.

The object of the present invention is to provide a tire profile having a good gripping capacity which is conticularly suitable for space-saving spare tires.

This object, and other objects and advantages of the present invention, will appear more clearly from the following specification in connection with the accompanying drawing, which is a partial plan view upon the inventive tread for a spare tire of a passenger motor vehicle.

The tread configuration of the present invention is characterized primarily by three rows of blocks, which are separated from each other by linearly extending peripheral grooves, whereby the width of the two outer rows under consideration individually corresponds essentially to the axial dimension of a block in each outer row, while with the middle row, the successive blocks in the middle row under consideration individually are laterally displaced or offset relative to each other in such a way that the collective width B of this central row is approximately 1.3 to 1.8 times the transverse (axial) dimension X of a block individually.

Such a profile or configuration makes available an extraordinarily good gripping capability as well as other good tire characteristics with the utilization thereof on spare tires, which, as well known, must be embodied in a manner to save space and weight. These tire characteristics are obtained with comparatively small profile depths, which in turn are needed in order to keep the dimensions of the spare tire small.

Referring now to the drawing in detail, the tread of the tire is limited on both sides by a serrated or notched edge 1, and is further defined by three peripheral rows 2, 3 and 4 respectively comprising essentially V-shaped blocks 5 in such a manner that the tips or points 6 of successive blocks 5 extend in opposite directions, i.e. once toward the left and once toward the right in an alternating pattern (in relation to the peripheral direction of the tire).

The width A of the rows 2 and 4 corresponds to the axial dimension of the blocks 5. The collective width B of the middle row 3, however, is larger than the width of the outer rows, amounting to approximately 1.6 times the (axial) dimension or width X of the individual blocks 5' forming the row 3, whereby a loosening is achieved in the middle region of the tread.

The width of the two peripheral grooves 7, respectively between the rows 2 and 3, and 3 and 4, is approximately 1.7 times the width of the slanted or inclined grooves 8 arranged between successive individual blocks 5. These widths correspond approximately to the depth of these grooves 7 and 8, or the depths are approximately 0.4 to 0.8 times the widths.

The effectiveness in the region of the tread edges is still further increased thereby that the ends 9 and the tips or points 10 of the blocks 5 located in the tread edges are arranged across from (axially in line with) the oppositely located projecting serration edges 11 of the lateral tread boundary.

It is decisive that the measurement of the width B is based upon the axial measurement of the width X of the individual blocks 5' (blocks 5' forming the row 3). Accordingly, there is clearly set forth upon which basis there is to be proceeded when the values of a range between 1.3 to 1.8, or especially the value 1.6 is to be selected.

In summary, the drawing shows the dimensions "A" for the outer row of blocks 5 as well as the dimension "X" for an inner row of a block 5'.

A ruler with millimeter measurements on it also can be placed on the view of the drawings to compare the dimensions A, B and/or X and the ratios or ranges as set forth agree substantially with such dimensioning. The distance X is approximately 2.5 millimeters and 1.6 times 2.5 equals approximately 4.00 millimeters according to the scale of the drawing.

The tread configuration for motor vehicles according to the present disclosure concerns tires for spare wheels used in an emergency and intended to assure travel over a predetermined distance.

The present invention is, of course, in no way restricted to the specific disclosure of the specification and drawing, but also encompasses any modifications within the scope of the appended claims.

What is claimed is:

1. A tread configuration for motor vehicle tires, especially spare tires comprising three peripheral rows of essentially V-shaped blocks, each block of which has a point and two ends, with the points of successive blocks in a given row, as seen in the peripheral direction of the tire, alternately pointing in opposite directions transverse to the peripheral direction of the tire, said rows of blocks being respectively separated from one another by linearly extending peripheral grooves, with the width of the two axially outer rows of blocks essentially corresponding to the axial dimension of each of said blocks individually in the respective outer row, while successive blocks of the middle row of blocks are laterally offset relative to each other in such a way that the collective width of said middle row is approximately 1.3 to 1.8 times the axial dimension of each of said blocks individually in the respective middle row and the collective width of the middle row is larger than the outer rows.

2. A tread configuration according to claim 1, which includes grooves between successive blocks as viewed in the peripheral direction of the tire, the depth of these grooves and of said peripheral grooves being about 0.4 to 0.8 times their width.

3. A tread configuration according to claim 1, in which the width of said peripheral grooves is approximately 1.7 times that of grooves arranged between successive blocks as viewed in the peripheral direction of the tire.

4. A tread configuration according to claim 1, in which the lateral regions of said tread configuration are notched, with axially outwardly extending notches of a given lateral tread region being axially in line with the axially outer ends and points of the associated outer row of blocks.

* * * * *